UNITED STATES PATENT OFFICE.

BURRITT S. LACY, OF SEWAREN, NEW JERSEY.

PROCESS OF MANUFACTURING METHYL CHLORID AND METHYLENE CHLORID.

1,190,659.  Specification of Letters Patent.  Patented July 11, 1916.

No Drawing.  Application filed September 28, 1914. Serial No. 863,985.

*To all whom it may concern:*

Be it known that I, BURRITT S. LACY, a citizen of the United States of America, and a resident of Sewaren, in the county of Middlesex, State of New Jersey, have invented certain new and useful Improvements in Processes for Manufacturing Methyl Chlorid and Methylene Chlorid, of which the following is a specification.

In my United States Letters Patent No. 1,111,842 issued Sept. 29, 1914, I have described a process of manufacturing methyl chlorid by chlorination of methane in the presence of a great excess of the latter constituent. I have now further discovered that by somewhat decreasing the proportion of methane, keeping, however, the methane always present still in large excess, a greater or less quantity of methylene chlorid, but practically no $CHCl_3$ or $CCl_4$, is formed together with the $CH_3Cl$. Thus for example while an initial reaction mixture of 20 volumes $CH_4$ to one volume $Cl_2$ results in nearly all of the "available chlorin" (that is of the ½ of the total chlorin which does not go into HCl) going into the form of $CH_3Cl$ and less than 10% into $CH_2Cl_2$; on the other hand by employing less than substantially about 10 volumes to 1, as for instance, an initial mixture of 4 volumes of $CH_4$ to 1 volume of $Cl_2$, about one-half of the available $Cl_2$ goes into $CH_3Cl$ and nearly as much into $CH_2Cl_2$, while the amounts of the two higher chlorids still remain small, and the reaction mixture still contains a large proportion of methane over and above that required to keep outside of the explosive limits of the gaseous mixture at ordinary temperature. The employment of a mixture of approximately 4 to 8 volumes of $CH_4$ to one volume chlorin is not only desirable when it is desired to increase the amount of $CH_2Cl_2$ obtained, but has the further advantage that the reaction heat evolved is sufficient to heat up the reaction constituents to the necessary temperature, *i. e.* to 400–800° C±. Suitable means should be employed to conserve the heat of reaction in order to maintain the aforesaid range of temperature, and, in this way external heating may, after once starting the reaction, be entirely dispensed with, especially if a catalyst such as a suitable porous contact body be used in the reaction chamber in order to accelerate the heating up of the incoming gases as well as the reaction velocity itself.

If finally we use less than about 4 volumes $CH_4$ to 1 volume chlorin, although the proportion of $CH_2Cl_2$ obtained, as compared with that of $CH_3Cl$ is increased, yet on account of the higher temperature produced by the heat of reaction when diluting volume of excess $CH_4$ is thus decreased, a tendency appears, and rapidly increases with further decrease in the proportion of methane, to decomposition of the products with accompanying carbonization; moreover, the formation of other compounds than the two lower chlorids $CH_3Cl$ and $CH_2Cl_2$ begins to be noticeable. I have found that, roughly speaking, it is advisable to use at least three volumes of methane to 1 volume of chlorin in order to avoid appreciable carbonization, *i. e.* that it is necessary to use a much larger proportion of methane than the one and one-half volumes which are necessary to merely keep outside the explosive limits of the gaseous mixture at ordinary temperature, the latter precaution being, it is self-evident, advisable for the sake of safety.

I claim:

1. The process of manufacturing methyl chlorid and methylene chlorid consisting in mixing chlorin gas with an excess of methane in the proportions of one volume of chlorin to more than such proportion of methane as is required to keep outside the explosive limits of the gaseous mixture at ordinary temperature but less than ten volumes of methane, and bringing said mixture to reaction.

2. The process of manufacturing methyl chlorid and methylene chlorid consisting in mixing chlorin gas with an excess of methane in the proportion of one volume of chlorin to from substantially about three to less than ten volumes of methane, and bringing said mixture to reaction.

3. The process of manufacturing methyl chlorid and methylene chlorid consisting in mixing chlorin gas with an excess of methane in the proportions of one volume of chlorin to less than ten volumes of methane and reacting said mixture at a temperature of from about 400° C. to 600° C.

4. The process of manufacturing methyl chlorin and methylene chlorid consisting in mixing chlorin gas with an excess of methane in the proportions of one volume of chlorin to from substantially about four to eight volumes of methane, bringing said mixture to reaction and conserving the heat of reaction to maintain the temperature at the necessary reaction point in the absence of application of external heat.

BURRITT S. LACY.

Witnesses:
CATHERINE A. COSTELLO,
OTTO K. ZWOINGENBERGER.